United States Patent [19]
Hoffman

[11] 3,943,423
[45] Mar. 9, 1976

[54] BATTERY CHARGING CIRCUIT

[76] Inventor: Philip A. Hoffman, 514 Piccadilly Road, Towson, Md. 21204

[22] Filed: Feb. 21, 1974

[21] Appl. No.: 444,496

Related U.S. Application Data

[63] Continuation-in-part of Ser. No. 392,225, Aug. 28, 1973, abandoned.

[52] U.S. Cl. ............... 320/22; 320/39; 320/DIG. 1; 323/4
[51] Int. Cl.² .................... H02J 7/10; G05F 1/44
[58] Field of Search ............. 323/4, 9, 22 T, 19, 24; 320/2, 20, 22, 27, 31, 39, 40, 56, DIG. 1; 307/74, 75; 321/18

[56] References Cited
UNITED STATES PATENTS

| | | | |
|---|---|---|---|
| 3,068,392 | 12/1962 | Santelmann, Jr. | 321/18 |
| 3,145,404 | 8/1964 | Fiedler | 320/2 X |
| 3,197,652 | 7/1965 | Wolf et al. | 323/9 UX |
| 3,413,537 | 11/1968 | Sharp et al. | 320/27 |
| 3,471,771 | 10/1969 | Mortimer | 320/DIG. 2 UX |
| 3,521,050 | 7/1970 | Shagena, Jr. | 320/2 X |
| 3,525,912 | 8/1970 | Wallin | 307/28 X |
| 3,586,954 | 6/1971 | Carves | 320/56 X |
| 3,876,921 | 4/1975 | Bigbee | 320/39 X |

Primary Examiner—J. D. Miller
Assistant Examiner—Robert J. Hickey
Attorney, Agent, or Firm—LeBlanc & Shur

[57] ABSTRACT

Disclosed is an improved circuit for recharging batteries. It can be used with alternating current power sources having a wide range of voltage and frequencies and also with low voltage direct current power sources. A transistor switch is connected in a feedback circuit to have, in effect, a variable resistance such that the charging current is high when the source potential is low and decreases to zero as the source potential increases. Charging efficiency is thereby significantly increased.

12 Claims, 8 Drawing Figures

BATTERY CHARGING CIRCUIT

This application is a continuation-in-part of copending application Ser. No. 392,225, filed Aug. 28, 1973, now abandoned, for Battery Charging Circuit.

This invention relates to a battery charging circuit for battery operated or so-called cordless hand tools and more particularly is directed to a simplified and inexpensive battery charger which may be incorporated directly into the hand tool.

Battery operated hand tools such as electric shavers, grass shears, electric drills and the like are evidencing an increased popularity largely due to the convenience afforded by these so-called cordless devices. Devices of this type are customarily provided with a small electric motor energized by one or more rechargeable battery cells incorporated within the tool housing along with the electric drive motor for the tool. The elimination of the conventional electrical cord for connecting the tool to an electric outlet increases the freedom with which the user of the tool may move about, eliminates the inconvenience of clearing the power cord from obstacles with which it may become entangled, and reduces the necessity for always having an electric outlet available. This latter feature can be an important advantage for those who travel or may spend time in remote locations where a convenient electrical power outlet is not always readily available.

Because of the not insignificant amount of electrical power drawn by even one of the small electric motors in a cordless hand tool, and because of the limited amount of power available from the relatively small batteries incorporated in devices of this type, it has become customary to provide the cordless hand tools with rechargeable batteries so as to avoid the necessity for frequent battery replacement. Present day rechargeable batteries, if properly maintained with a sufficient charge, have an extended life and greatly enhance the convenience with which the tool may be operated.

Since most cordless hand tools operate from a battery potential of only a few volts, it has been thought necessary in the past to recharge the batteries from a conventional 177 volt - 60 Hz electrical outlet through a voltage step-down transformer. These transformers are necessarily of substantial size and increase not only the size but also the cost and weight of the battery charger. The size and weight of the battery charger, in particular the step-down transformer, has made it impossible to incorporate the charging circuit directly into a hand tool and for this reason most cordless hand tools are provided with separate battery chargers. The separate battery charger represents both an added cost factor in the price of a hand tool and an inconvenience in handling and storage as well as packaging of the charger.

The present invention overcomes these difficulties by providing a charging circuit for the small batteries of a hand operated tool of simplified and inexpensive construction and one which in particular eliminates the relatively bulky and heavy voltage step-down transformer incorporated in previous battery chargers of this type. Because of its simplicity and small size and weight, the battery charger of the present invention may be incorporated directly into the housing of a hand tool without significantly increasing its cost and weight or size, so that no provision need be made for packaging, handling or storing a separate battery charger. When recharging of the hand tool batteries is necessary, a simple cord connection to a conventional 117 volt household outlet is sufficient to recharge the tool batteries.

In the present invention, the tool batteries are recharged from a conventional household outlet through a novel transistor switching circuit which supplies a series of periodic recharging impulses to the batteries at voltage and current levels compatible with the low voltage nickel-cadmium batteries conventionally used in present day cordless hand tools. Important features of the invention include the provision of a simplified and inexpensive transistor charging circuit which can be used to charge a nickel-cadmium battery from a conventional 117 volt AC outlet, a conventional 240 volt AC outlet, or from a low voltage direct current power source such as a 12 volt automotive or truck battery or alternator. A further important feature of the invention is the provision of a novel charging circuit in which the charging current to the battery is high when the source voltage is low so as to provide increased charging efficiencies.

In the present invention, the battery cell or cells to be charged are connected to a conventional 117 volt - 60 Hz power outlet by what is in effect a variable resistance switch. The switching device is in the form of a PNP junction transistor which is switched at an appropriate time in a cycle of the AC input to supply charging current to the battery to be recharged. By connecting the transistor switch in a novel feedback arrangement, the effective resistance of the switch may be made to vary in accordance with the instantaneous input voltage so that as the instantaneous input voltage rises substantially above the potential of the battery to be charged, the charging current is decreased to zero. Because of this feedback, the charging current is high when the source voltage is low and vice versa. That is, the charging current falls to zero when the source voltage greatly exceeds the battery potential. The result is maximum charging efficiency such that the charging efficiency with feedback is increased by a factor of 2 or 3 over the charging efficiency without feedback.

Also disclosed is a manual switch for switching the battery from a charge position to an operate position in which the battery energizes the hand tool motor, a charging rate varying circuit for decreasing the charging rate as the battery potential is brought up to near full charge, and the incorporation in the circuit of a light bulb used both as an indicator and as a variable resistor to compensate for changes in supply voltage.

It is therefore one object of the present invention to provide an improved battery charger for recharging the relatively small batteries of a hand tool or the like from a conventional 117 volt household outlet.

Another object is to provide a hand tool battery charger which can be operated from both AC and DC.

Another object of the present invention is to provide an improved switching-type battery charger for hand tools which eliminates the need for a step-down transformer or other inductors.

Another object of the present invention is to provide a pulse charging circuit for the batteries of battery operated electrical motors having increased charging efficiency.

Another object of the present invention is to provide a simplified, inexpensive, small and light-weight battery charger which may be incorporated directly into the housing of a hand tool without significantly increasing its cost, size or weight.

Another object of the present invention is to provide a simplified type of switching battery charger for charging relatively small rechargeable batteries of all types.

Another object of the present invention is to provide a battery charger which may be used on conventional 117 volt and 240 AC power or on relatively low DC power such as the 12-volt DC power supply of an automobile, truck, boat or the like.

Another object of the present invention is to provide a battery operated or cordless hand tool which may be recharged by a simple cord connection to a conventional 117 volt AC electrical power outlet.

Another object of the present invention is to provide a simplified and inexpensive battery charger which may be manufactured at least for the most part as an integrated circuit.

These and further objects and advantages of the invention will be more apparent upon reference to the following specification, claims, and appended drawings, wherein:

Figure 1:
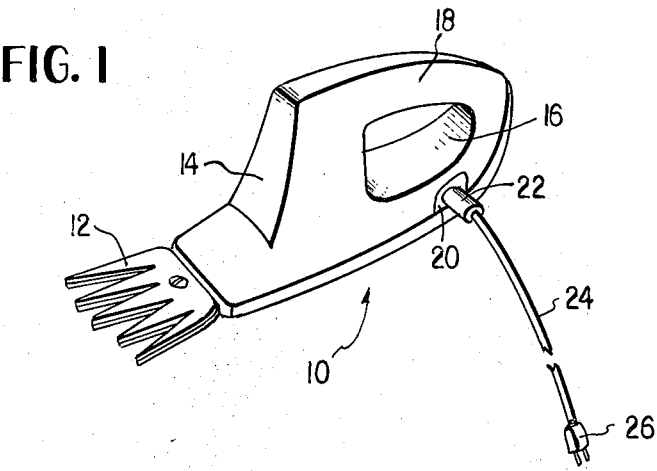
FIG. 1 is a perspective view of a hand tool in the form of a battery operated grass shear constructed in accordance with the present invention.

Referring to the drawings, FIG. 1 shows a cordless or a battery operated hand tool in the form of a grass shear or a grass clippers 10. The grass shear 10 comprises the shearing blades 12 supported from a housing 14 which is apertured as at 16 to provide an integral handle portion 18. Within the housing 14 is an electric motor connected to drive blades 12 and a power supply battery for the motor, as more fully shown in FIG. 2. On the side of the housing 14 is a socket 20 which acts as a receptacle for a power supply plug 22 connected to one end of a power supply cord. The other end of the cord 24 contains the usual prongs 26 for insertion into a conventional 117 volt - 60 Hz household power outlet. During normal operation, the plug 22 is removed from the socket 20 but when the battery is to be recharged, the cord 24 is connected to the household outlet and plug 22 is inserted into socket 20 to recharge the battery. When charging has been completed, plug 22 is removed.

Figure 2:
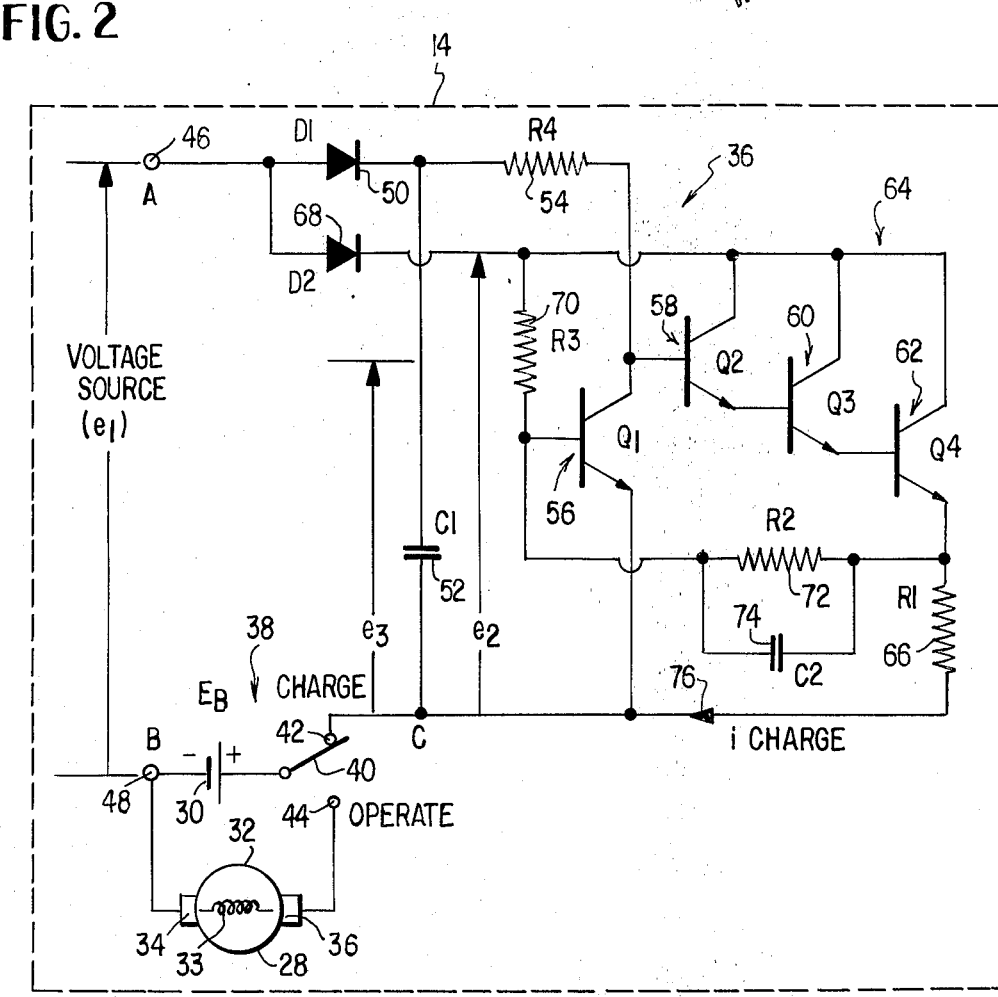
FIG. 2 is a circuit diagram of the basic charging circuit of the present invention as incorporated in the housing of the hand tool of FIG. 1.

FIG. 2 is a detailed circuit diagram of the basic charging circuit of the present invention adapted to be incorporated into the housing 14 of the grass shear 10 of FIG. 1. Also shown in FIG. 2 is the electric motor 28 for driving the shear blades 12 and the motor energizing battery 30. By way of example only, motor 28 may be a small permanent magnet electric motor having an armature 32 with inductive windings 33 to which electrical connection is established by the motor brushes 34 and 36. Battery 30 in this embodiment may comprise four conventional 1.3 volt nickel-cadmium rechargeable battery cells in series to provide a battery voltage of approximately 5.2 volts when fully charged.

The battery charging circuit is generally indicated at 36 and is connected to battery 30 labeled E, by a manual switch 38 having a movable contact 40 for selective engagement with the stationary contact 42 which is the "charge" position of the switch. When contact 40 is moved to engage stationary contact 44, the charger is taken out of the circuit and in this "operate" position of the switch, the battery 30 energizes motor 28.

The basic charging circuit 36 of FIG. 2 has been used to charge both 2.6 volt and 5.2 volt nickel-cadmium batteries from 117 volt - 60 Hz power supplies, and also from a 12-volt storage battery. It comprises a pair of input terminals 46 and 48 labeled A and B, respectively, with terminal 48 connected to the negative side of battery 30. Movable contact 40 is connected to the positive side of the battery. The other input terminal 46 is connected through a diode 50 labeled D1 to a capacitor 52 labeled C1. Diode 50 is also connected through a resistor 54 labeled R4 to the collector of a switching transistor 56 labeled Q1. In the preferred embodiment, transistor 56 is an NPN junction transistor. Switching transistor 56 is in turn connected to NPN junction transistors 58, 60 and 62, labeled Q2, Q3, and Q4, respectively, which, taken together, form a Darlington amplifier generally inidcated at 64. The emitter of transistor 62 (Q4) is returned to the positive side of battery 30 by way of a resistor 66 labeled R1.

Input terminal 46 is also connected through a second diode 68 labeled D2 to the collectors of the Darlington transistors 58, 60 and 62, and through a resistor 70 labeled R3 to the base of switching transistor 56. Switching transistor 56 has its base also connected to the emitter of transistor 62 (Q4) through a feedback circuit comprising a resistor 72 labeled R2 in parallel with a capacitor 74 labeled C2.

Figure 3A:
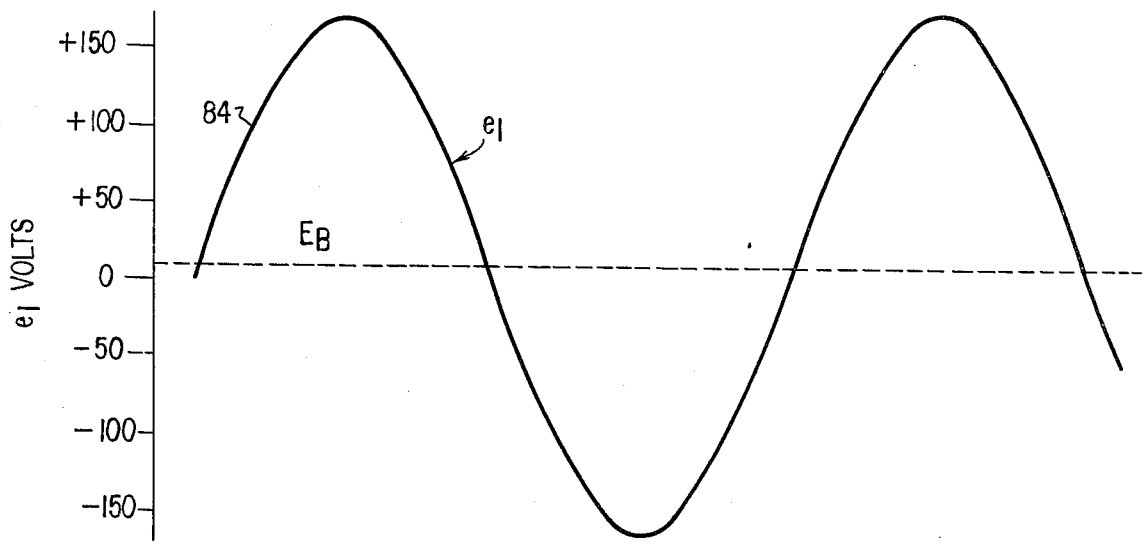
FIGS. 3A, 3B and 3C are voltage and current waveforms at various locations in the circuit of FIG. 2.
Figure 3B:
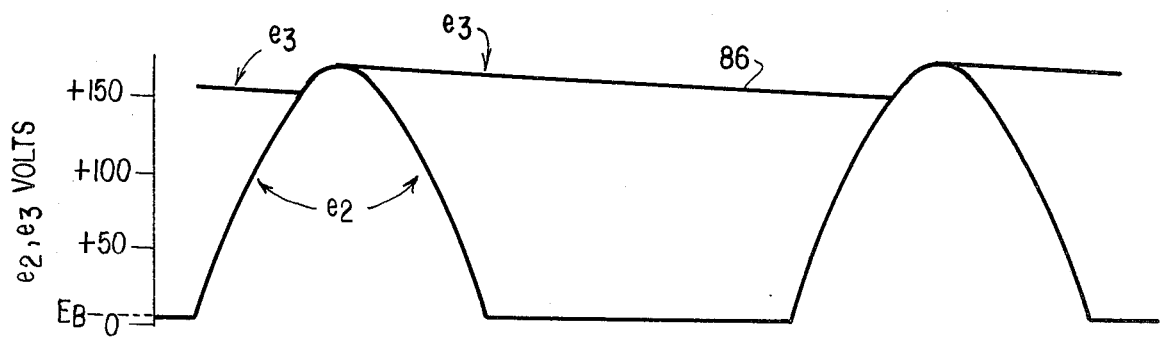
Figure 3C:
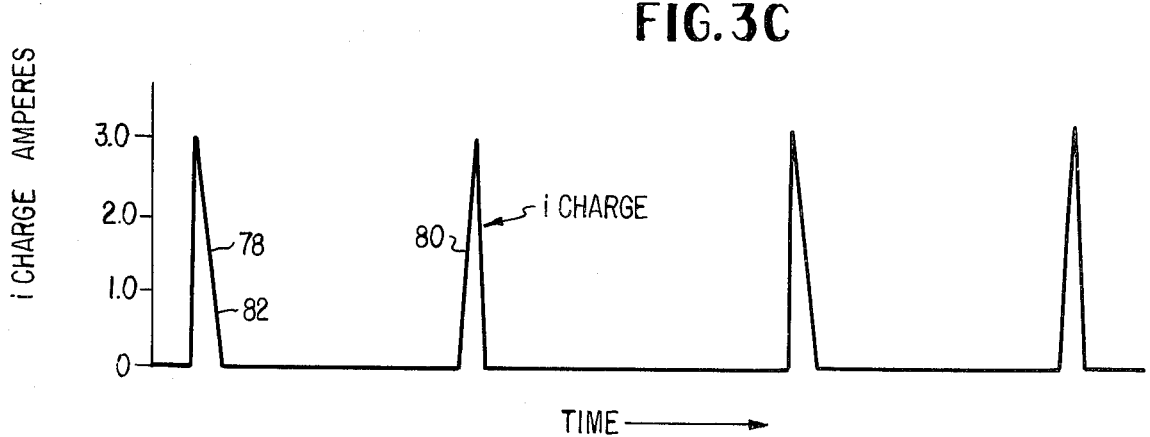

A source of power, as indicated by the voltage source $e_1$, is connected between the input terminals A and B. The battery 30 to be charged is connected between terminals B and C when switch 38 is in the position shown. FIG. 3A is a plot of voltage as a function of time and shows the input or source voltage $e_1$ for a conventional 117 volt RMS 60 Hz household outlet power supply. FIG. 3B is the waveform of the rectified supply voltage $e_2$ at the output of rectifier diode 68 (D2) as well as the voltage $e_3$ developed across capacitor 52 (C1). The voltage waveforms are shown in FIGS. 3A and 3B for a little over 1½ cycles of the 60 Hz input. FIG. 3C is a corresponding waveform for the charging current indicated by the arrow 76 in FIG. 2 through resistor 66 and into the positive side of the battery 30. As can be seen in FIG. 3C there are two current spikes 78 and 80 for each cycle of the AC input.

Figure 4:
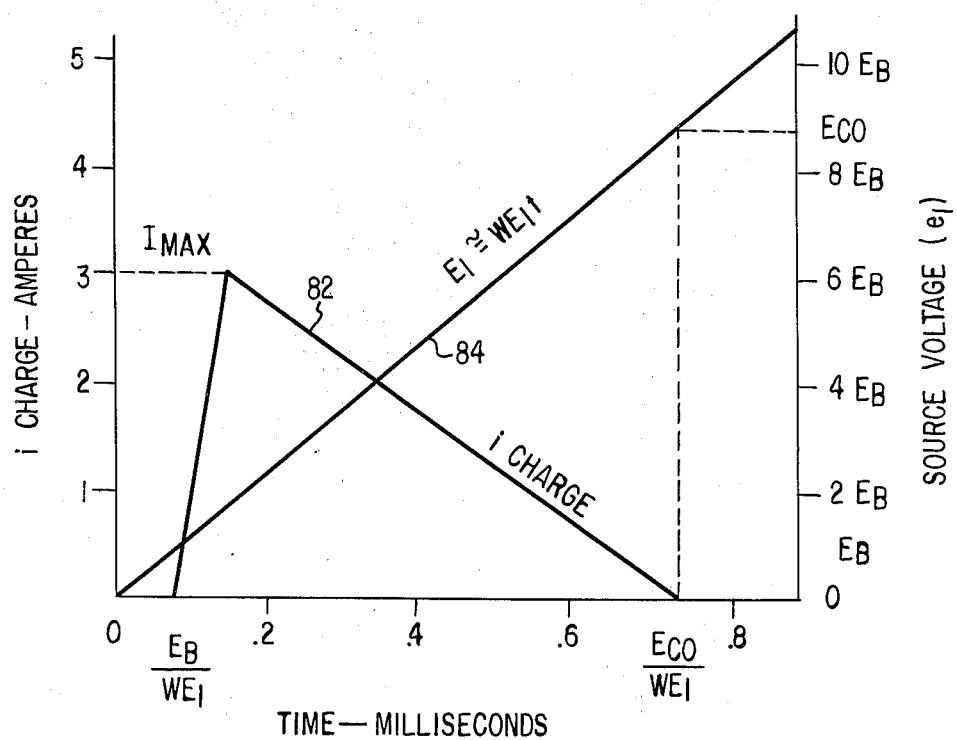
FIG. 4 is a plot of charging current and charging voltage as a function of time during a small portion of a 60 Hz input cycle.
Figure 5:
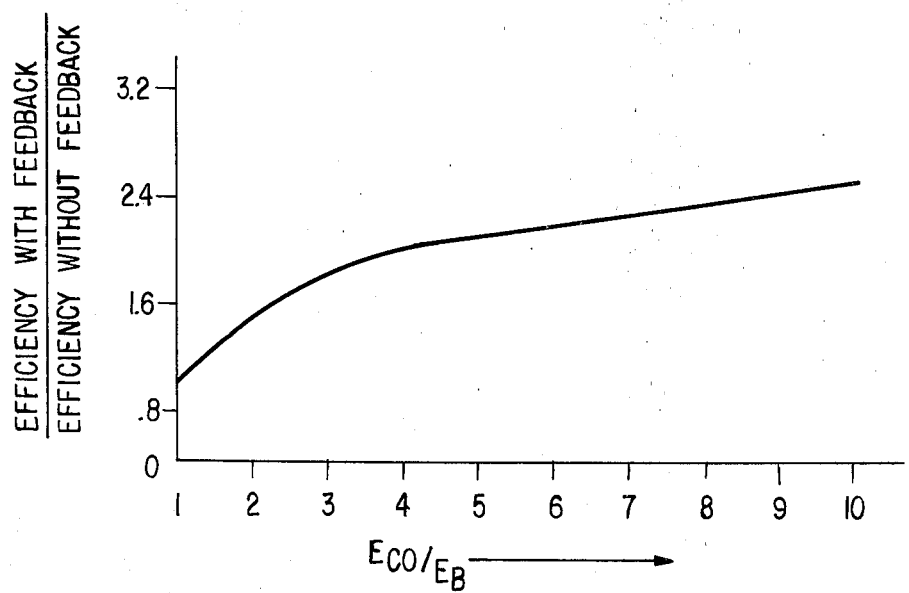
FIG. 5 is a plot of efficiency ratios.

FIG. 4 is a plot of the charging current 82 and the source voltage 84 and in fact is a greatly amplified view of a small portion of the corresponding waveform 82 of FIG. 3C and 84 of FIG. 3A during the period over which the first spike 78 exists. FIG. 5 is a plot of the ratio of the charging efficiency with feedback to that without feedback as a function of operating voltages as more fully described below.

Referring again to FIG. 2, diode D1 and capacitor C1 provide a source of input current for the Darlington amplifier consisting of transistors Q2, Q3, and Q4. The voltage across capacitor C1 is shown in FIG. 3B at 86 and is labeled $e_3$. Capacitor C1 discharges through resistor R4.

Diode D2 provides a unipolar signal to the collectors of transistors Q2, Q3, and Q4 and to the base of transistor Q1 through resistor R3.

When the source voltage 84 ($e_1$) is positive and slightly greater than the battery potential ($E_B$), transistor Q1 does not conduct and the discharge current from C1 flows through resistor R4 into the base of transistor Q2. This current is amplified by transistors Q2, Q3 and Q4, and flows through resistor R1 into the battery, thereby charging the battery.

Referring to FIG. 2, the transistor $Q_1$ and its collector load resistor $R_3$ along with the Darlington amplifier ($Q_2$, $Q_3$ and $Q_4$) may be thought of as forming an electronic signal amplifier. The supply voltage for this amplifier is the potential $e_2$. The input terminal for the amplifier is the base of transistor $Q_1$ and the output terminal is the emitter of $Q_4$. The common terminal for the input and output signals is the emitter of $Q_1$. The voltage gain of the amplifier is negative, i.e., as the input voltage increases the output voltage decreases. Resistors $R_1$, $R_2$ and $R_3$ form a feedback network external to the amplifier. Operation of the amplifier with feedback is as follows:

When the voltage source ($e_1$) is positive and exceeds the battery potential slightly, transistor $Q_4$ conducts and conventional current flows from the emitter of $Q_4$ through resistor $R_1$ into battery 30. A potential equal to $R_1 i_{charge}$ is developed across resistor $R_1$ and is coupled to the input terminal of the amplifier at the base of $Q_1$ by the resistors $R_2$ and $R_3$.

The supply potential $e_2$ (which is equal to the source voltage $e_1$ less the battery potential $E_B$) is also coupled to the amplifier input terminal by resistors $R_1$, $R_2$ and $R_3$. The amplifier, in feedback, operates so that a small amount of current flows into the base to emitter junction of transistor $Q_1$. When $Q_1$ is a silicon transistor, the potential across this base to emitter junction is maintained at approximately 0.6 volts by the feedback action.

The resistors $R_1$, $R_2$ and $R_3$ are proportioned so that when the amplifier supply voltage is small the output current is controlled primarily by the potential across $R_1$. This potential is coupled to the base of $Q_1$ by the network consisting of $R_2$ and $R_3$. Thus when the amplifier supply voltage is small, the output current is at maximum. As the amplifier supply voltage increases, less output current is required to maintain the base to emitter junction potential at approximately 0.6 volt so the output current is automatically reduced. As the amplifier supply voltage, $e_2$, is increased still further, the output current is reduced to zero.

If the voltage source is a sine wave with peak amplitude considerably greater than the voltage of the battery to be charged, the charging current takes the form of impulses as shown in FIG. 3C. These impulses peak when the amplifier supply voltage, $e_2$, is at the lowest value which will sustain the peak current. When the source voltage is greater than the value which produces maximum charging current, the charging current is reduced by the feedback action described previously. The charging current is reduced to zero when the amplifier supply voltage is large enough to saturate transistor $Q_1$ via the resistor network consisting of $R_1$, $R_2$ and $R_3$. The charging current remains at zero for all values of $e_2$ which are greater.

This method of shaping the impulses of battery charging current results in relatively high efficiency battery charging if the voltage source is a sine wave. The following equations illustrate, in approximate form, the current shaping and the efficiency of the process.

The feedback network consisting of resistors R1, R2 and R3 causes the charging current to be large when the source voltage is small and to decrease to zero as the source voltage increases. The following equations illustrate this relationship in idealized form:

$$e_{b1} = E_B + R_1 i + \frac{R_2}{R_2 + R_3}(e_2 - R_1 i)$$

$$e_{e1} = E_B$$

where
$e_{b1}$ = voltage at base of Q1
$e_{e1}$ = voltage at emitter of Q1

$$e_{b1} - e_{e1} = 0.6 = \frac{R_3}{R_2 + R_3} R_1 i + \frac{R_2}{R_2 + R_3} e_2$$

$$i = \left(1 + \frac{R_2}{R_3}\right)\frac{0.6}{R_1} - \frac{R_2}{R_3}\frac{e_2}{R_1}$$

When such a variable resistance electronic switch is connected in series with a battery to be charged, and this series combination is connected to a conventional source of alternating current power, a relatively high efficiency charging of the battery occurs. The following equations illustrate the efficiency of this charging process wherein the highest charging current occurs at the lower supply voltages and vice versa.

$e_1 = E_1 \sin \omega t$ is the input voltage. During the first charging interval shown in FIG. 3C, $e_1$ is approximated by the following equation:

$$e_1 \cong E_1 \omega t$$

$$e_2 \cong E_1 \omega t - E_B$$

$$i_{CHARGE} \cong \left(1 + \frac{R_2}{R_3}\right)\frac{0.6}{R_1} - \frac{R_2}{R_3}\frac{e_2}{R_1} \text{ for}$$

$$\frac{E_B}{\omega E_1} < t < \frac{E_B + \left(1 + \frac{R_3}{R_2}\right) 0.6}{\omega E_1}$$

FIG. 4 is an expanded graph of the critical waveforms existing in the first charging interval shown in FIGS. 3A and 3C.

The following equations show the amount of energy required from the power source to produce any one of the impulses of charge in FIG. 3C when the source resistance and the series resistance of the transistor switch are negligible. For convenience, the energy dissipated in resistors $R_2$, $R_3$ and $R_4$ and transistor $Q_1$ is ignored.

In FIG. 4, $E_{co}$ is the magnitude of $e_1$ when the charging current ($i_{CHARGE}$) is controlled to zero by the feedback network described previously. $E_B/\omega E_1$ is the time when $e_1$ just equals the battery voltage and $E_{co}/\omega E_1$ is the time when the charging current has just been reduced to zero or cut off.

$W_{in}$ = Energy from Source $$W_{in} = \int_{\frac{E_B}{\omega E_1}}^{\frac{E_{co}}{\omega E_1}} e_1 \, i \, dt$$

$$e_1 \cong \omega E_1 t$$

$$i \cong I_{max} \left( \frac{E_{co}}{E_{co}-E_B} - \frac{\omega E_1 t}{E_{co}-E_B} \right) \frac{E_B}{\omega E_1} < t < \frac{E_{co}}{\omega E_1}$$

$$W_{in} = \frac{\omega E_1 I_{max}}{E_{co}-E_B} \int_{\frac{E_B}{\omega E_1}}^{\frac{E_{co}}{\omega E_1}} (E_{co} t - \omega E_1 t^2) dt$$

$$W_{in} = \frac{I_{max}}{\omega E_1 (E_{co}-E_B)} [1/2 \, E_{co}(E_{co}^2-E_B^2) - 1/3 \, (E_{co}^3-E_B^3)]$$

$$W_{in} = \frac{I_{max}}{\omega E_1} [1/6 E_{co}^2 + 1/6 E_{co} E_B - 1/3 E_B^2]$$

$$W_{in} = \frac{I_{max}}{6\omega E_1} [E_{co}^2 + E_{co} E_B - 2E_B^2]$$

The amount of energy which enters the battery during each impulse is equal to the charge entering the battery times the battery voltage.

$$QE_B = W_{OUT} = E_B \int_{\frac{E_B}{\omega E_1}}^{\frac{E_{co}}{\omega E_1}} i_{CH} dt$$

This integral is equal to the area under the current curve 82 in FIG. 4 multiplied by $E_B$ and is:

$$W_{OUT} = \frac{1}{2} I_{max} \left( \frac{E_{co}}{\omega E_1} - \frac{E_B}{\omega E_1} \right) E_B$$

$$= \frac{I_{max}}{2\omega E_1} (E_{co} - E_B) E_B$$

Charging Efficiency $= \dfrac{W_{OUT}}{W_{IN}}$ $$\frac{W_{OUT}}{W_{IN}} = \frac{\frac{I_{max}}{2\omega E_1}(E_{co}-E_B) E_B}{\frac{I_{max}}{6\omega E_1}(E_{co}^2 + E_{co}E_B - 2E_B^2)}$$

$$= \frac{3E_B}{E_{co} + 2E_B}$$

If charging were accomplished without the feedback feature described above, and the switch were turned on at $e_1 = E_B$ and off at $e_1 = E_{co}$ (and vice versa later in the cycle) with a constant series resistance, the efficiency of charging a battery would equal $E_B/E_{co}$. This assumes that switching is accomplished twice per cycle as shown in FIG. 3C. The ratio of the charging efficiencies is:

$$\frac{\text{Efficiency with feedback}}{\text{Efficiency without feedback}} = \frac{3}{1 + \frac{2E_B}{E_{co}}}$$

FIG. 5 is a graph of this function which illustrates that for practical values of the ratio $E_{co}/E_B$, the ratio of improvement with feedback is in excess of two.

Figure 6:
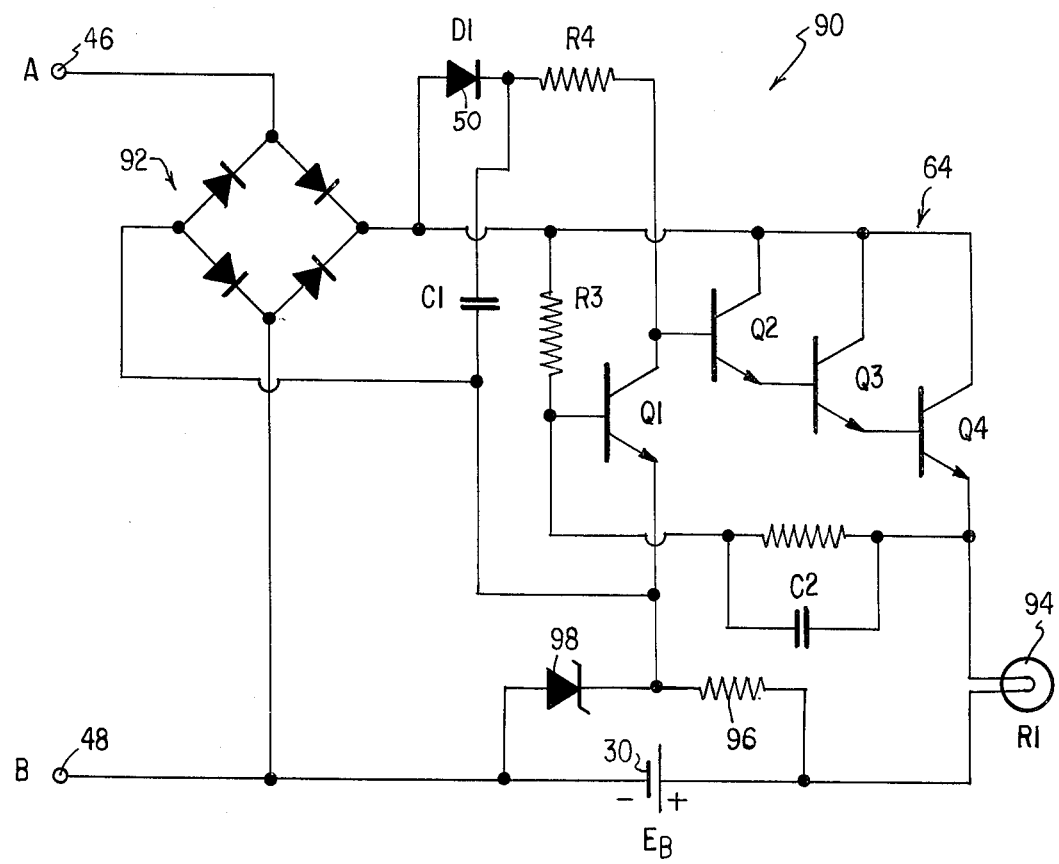
FIG. 6 is a circuit diagram similar to that of FIG. 2 showing a modified battery charging circuit in accordance with this invention.

FIG. 6 shows a modified charging circuit 90 constructed in accordance with the present invention in which like parts bear like reference numerals. It is understood that the circuit 90 of FIG. 6 can be incorporated in the housing 14 in the same manner as the circuit of FIG. 2 and that the battery 30 in FIG. 6 is connected to a hand tool motor 28 in the same manner as previously described. These features have been omitted from the embodiment in FIG. 6 for the sake of clarity.

The modified circuit 90 of FIG. 6 is in all respects identical to the basic circuit of FIG. 2 but with three exceptions, namely, the diode D2 in FIG. 2 is replaced in FIG. 6 by a full wave rectifier bridge 92, resistor R1 in FIG. 6 is replaced by an incandescent lamp 94, and finally, the embodiment of FIG. 6 includes an automatic charging rate circuit comprising a resistor 96 and a zener diode 98.

In FIG. 6, the diode rectifier bridge 92 acts to double the output current with no change in the efficiency. This causes four charging impulses per cycle of the input wave as opposed to the two pulses previously described. In the preferred construction in FIG. 6, the diode 50 (D1) is connected to the output of the diode bridge since this permits a reduction in the capacity of capacitor C1.

Resistor 94 in FIG. 6 is preferably an incandescent light bulb to provide regulation for changes in the supply voltage. As the charging current increases with decreasing supply voltage, the bulb resistance increases, thereby tending to hold the charging current constant. The circuit of FIG. 6 also includes an automatic charging rate circuit comprising resistor 96 and Zener diode 98 which act to reduce the charging current as the battery approaches full charge.

It is apparent from the above, that the present invention provides an improved charging circuit which, while described in conjunction with battery operated hand tools or so-called cordless tools, can be used to charge all types of relatively low potential rechargeable batteries. Important features of the present invention in addition to relative simplicity and small size and expense is the increased charging efficiencies obtainable, as well as the versatility of the circuit in being usable for charging batteries from alternating current power sources with a wide range of voltages and frequencies while at the same time also usable to charge batteries from a low voltage direct current power source. Although the invention is described as using junction transistors, it is apparent that similar results can be achieved with field effect transistors and that the circuit of the present invention can be constructed, at least to a substantial extent, using integrated circuit techniques. It is possible to construct the circuit so that batteries may be charged from 117 volts AC, 240 volts AC or 12 volts DC without any manual adjustment or switching. The charging circuit can be constructed in considerably smaller volume than a transformer and rectifier system of equivalent charging capacity and is particularly adapted for incorporation directly into a battery operated device.

By way of example only, the following is a list of typical values for the circuit parameters of the basic circuit illustrated in FIG. 2:

$R_1 = 0.18 \, \Omega$
$R_2 = 6,800 \, \Omega$
$R_3 = 270,000 \, \Omega$
$R_4 = 120,000 \, \Omega$
$Q1, Q2, Q3, Q4 = GE-32$
$D1, D2 = GE-510$
$C1 = 1.0 \, \mu f$
$C2 = 0.047 \, \mu f$
$I_{AVE} = 0.12$ Ampere when source is 120V, 60Hz.

The invention may be embodied in other specific forms without departing from the spirit or essential characteristics thereof. The present embodiments are, therefore, to be considered in all respects as illustrative and not restrictive, the scope of the invention being indicated by the appended claims rather than by the foregoing description, and all changes which come within the meaning and range of equivalency of the claims are, therefore, intended to be embraced therein.

What is claimed is:

1. A battery charger comprising a pair of battery terminals for connection to a rechargeable battery, a pair of input terminals for connection to an electrical power source, and an electrical charging circuit coupling said input terminals to said battery terminals for supplying a charging current to said battery terminals, said charging circuit comprising a switching transister having a control electrode and a current amplifier coupled to said input terminals permitting charging current flow to said battery terminals when a conventional 60 Hz. household outlet electrical source is applied to said input terminals only during those portions of a source cycle when the source voltage is below a predetermined voltage level substantially less than its maximum, and negative feedback means coupling the output of said current amplifier to said control electrode of said transistor whereby greater charging current flows at lower source voltage levels.

2. A battery charger according to claim 1 wherein said charging circuit starts to reduce said charging current when said source potential exceeds approximately six times the battery potential.

3. A battery charger according to claim 2 wherein said charging circuit comprises means for reducing said charging current to zero when the source potential at said input terminals exceeds the potential of a battery connected to said battery terminals by a predetermined amount.

4. A battery charger according to claim 3 wherein said charging circuit reduces said charging current to zero when said source potential exceeds approximately nine times the battery potential.

5. A battery charger according to claim 1 wherein said charging circuit provides charging current only when the source potential has a magnitude between about one and ten times the battery potential.

6. A battery charger according to claim 1 including at least one rectifier diode coupling said input terminals to said current amplifier.

7. A battery charger according to claim 1 wherein said charging circuit includes an incandescent lamp for compensating for variations in supply voltage.

8. A battery charger according to claim 1 wherein said charging circuit comprises means for automatically varying the charging rate in accordance with the charge on a battery connected to said battery terminals.

9. A battery charger according to claim 8 wherein said automatic rate varying means comprises a resistor and a zener diode coupled across said battery terminals.

10. A battery charger according to claim 1 comprising a hand tool housing, said charging circuit being located in said housing, an electrical motor in said housing for operating said tool, and means in said housing for coupling said motor to said battery terminals.

11. A battery charger according to claim 10 wherein said housing includes an electrical AC power connector coupled to said charging circuit, and a cord for directly connecting said AC power connector to a conventional household power outlet.

12. A battery charger comprising a pair of battery terminals for connection to a rechargable battery, a pair of input terminals for connection to an electrical power source, and an electrical charging circuit coupling said input terminals to said battery terminals for supplying a charging current to said battery terminals, said charging circuit comprising a switch coupled to said input terminals permitting charging current flow to said battery terminals when a conventional 60 Hz. household outlet electrical source is applied to said input terminals only during those portions of a source cycle when the source voltage is below a predetermined voltage level substantially less than its maximum, said switch comprising a transistor and feedback means coupled to said transistor for varying the impedance of said switch in accordance with variations in source voltage whereby greater charging current flows at lower source voltage levels, said charging circuit including means for increasing said charging current with increasing source potential below said predetermined level.

* * * * *

UNITED STATES PATENT AND TRADEMARK OFFICE
CERTIFICATE OF CORRECTION

PATENT NO. : 3,943,423
DATED : March 9, 1976
INVENTOR(S) : Philip A. Hoffman

It is certified that error appears in the above-identified patent and that said Letters Patent are hereby corrected as shown below:

Col. 1, line 45, "177 volt" should read --117 volt--.

Col. 6, line 28, insert ( ) before 1 and after $\frac{R_2}{R_3}$.

Col. 6, line 65, "$E_B/wE_1$" should read -- $\frac{E_B}{wE_1}$ --.

Col. 6, line 66, "$E_{co}/wE_1$" should read -- $\frac{E_{co}}{wE_1}$ --.

Col. 7, line 52, insert solid line between $\frac{W_{OUT}}{W_{IN}}$.

Col. 7, line 61, "$E_B/E_{co}$" should read -- $\frac{E_B}{E_{c0}}$ --.

Col. 8, line 38, "manne" should read --manner--.

Signed and Sealed this

Twenty-third Day of November 1976

[SEAL]

Attest:

RUTH C. MASON
Attesting Officer

C. MARSHALL DANN
Commissioner of Patents and Trademarks